US 6,500,393 B2

United States Patent
Nakamori et al.

(10) Patent No.: US 6,500,393 B2
(45) Date of Patent: *Dec. 31, 2002

(54) METAL SUPPORT FOR EXHAUST GAS PURIFYING CATALYST

(75) Inventors: Masaharu Nakamori, Wako (JP); Katsunori Okubo, Wako (JP); Tadahisa Masatani, Wako (JP); Masashi Yokoyama, Wako (JP); Hiroaki Miyata, Wako (JP); Yukinori Kaneda, Hamamatsu (JP); Toshiaki Okada, Hamamatsu (JP); Mitsunori Takekawa, Hamamatsu (JP); Shigeo Kimura, Hamamatsu (JP); Manabu Shinchi, Hamamatsu (JP)

(73) Assignees: Honda Giken Kogyo Kabushiki Kaisha, Tokyo (JP); Yutaka Giken Co., Ltd., Shizouka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,353

(22) Filed: Dec. 23, 1998

(65) Prior Publication Data

US 2002/0081245 A1 Jun. 27, 2002

(30) Foreign Application Priority Data

Jan. 8, 1998 (JP) .......................... 10-002580

(51) Int. Cl.⁷ ............. B01J 35/04; B01D 53/34
(52) U.S. Cl. ........ 422/180; 422/177; 502/439; 228/181; 428/593; 428/594

(58) Field of Search ................ 422/177, 180, 422/222; 428/593–594, 116; 228/181; 502/439

(56) References Cited

U.S. PATENT DOCUMENTS

| | | | | |
|---|---|---|---|---|
| 4,521,947 A | * | 6/1985 | Nonnenmann et al. | 422/177 |
| 4,824,011 A | * | 4/1989 | Maus et al. | 228/181 |
| 5,153,167 A | * | 10/1992 | Saito et al. | 502/439 |
| 5,366,700 A | * | 11/1994 | Humpolik et al. | 422/180 |
| 5,436,216 A | | 7/1995 | Toyao et al. | 422/180 |
| 5,791,043 A | * | 8/1998 | Okabe et al. | 228/181 |

FOREIGN PATENT DOCUMENTS

| | | |
|---|---|---|
| JP | 4-35271 | 6/1992 |
| JP | 5-228376 | 9/1993 |

* cited by examiner

Primary Examiner—Hien Tran
(74) Attorney, Agent, or Firm—Arent Fox Kintner Plotkin & Kahn, PLLC

(57) ABSTRACT

A cylindrical honeycomb structure formed by spirally winding a strip metal flat sheet and a strip metal corrugated sheet overlapped thereon. The metal flat sheet is welded, at each turn, to the metal corrugated sheet at a plurality of axially arranged welding positions on each portion where the metal flat sheet contacts the metal corrugated sheet. Letting L be the axial length of the honeycomb structure and D be the diameter of the honeycomb structure, the maximum value $L_1$ of distances between adjacent welding positions satisfies at least one of relationships given by $L_1 \leq D/2$ and $L_1 \leq L/2$, or the distance $L_2$ between the outermost welding positions in the axial direction of the honeycomb structure and the outer end face of the honeycomb structure satisfies at least one of relationship given by $L_2 \leq D/20$ and $L_2 \leq L/10$.

1 Claim, 9 Drawing Sheets

REDUCTION RATIO OF STRENGTH
AFTER HEAT CYCLES

REDUCTION RATIO OF STRENGTH
AFTER HEAT CYCLES

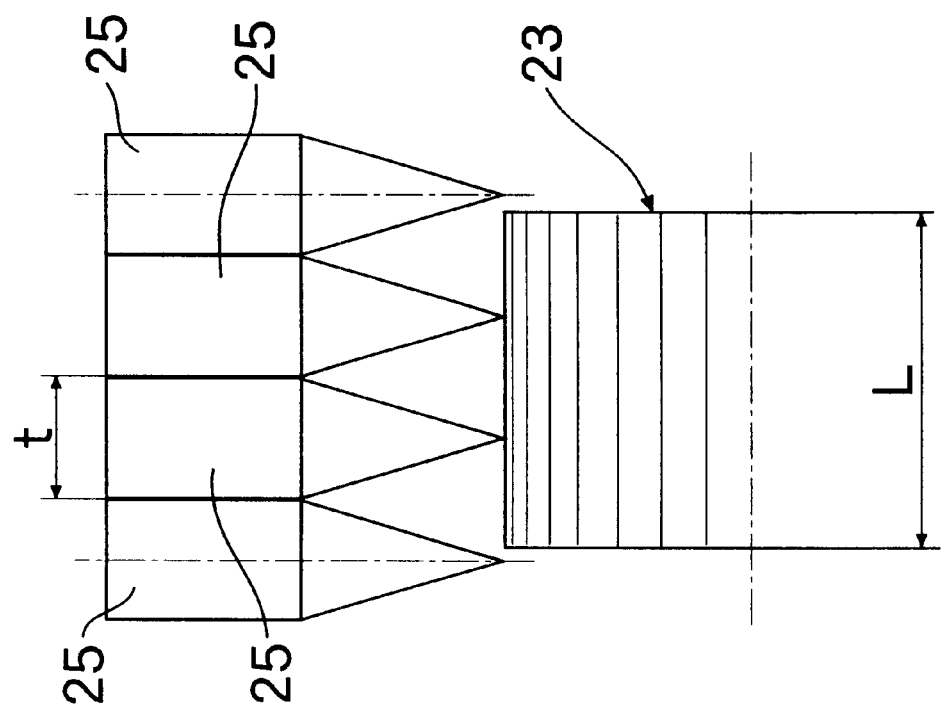
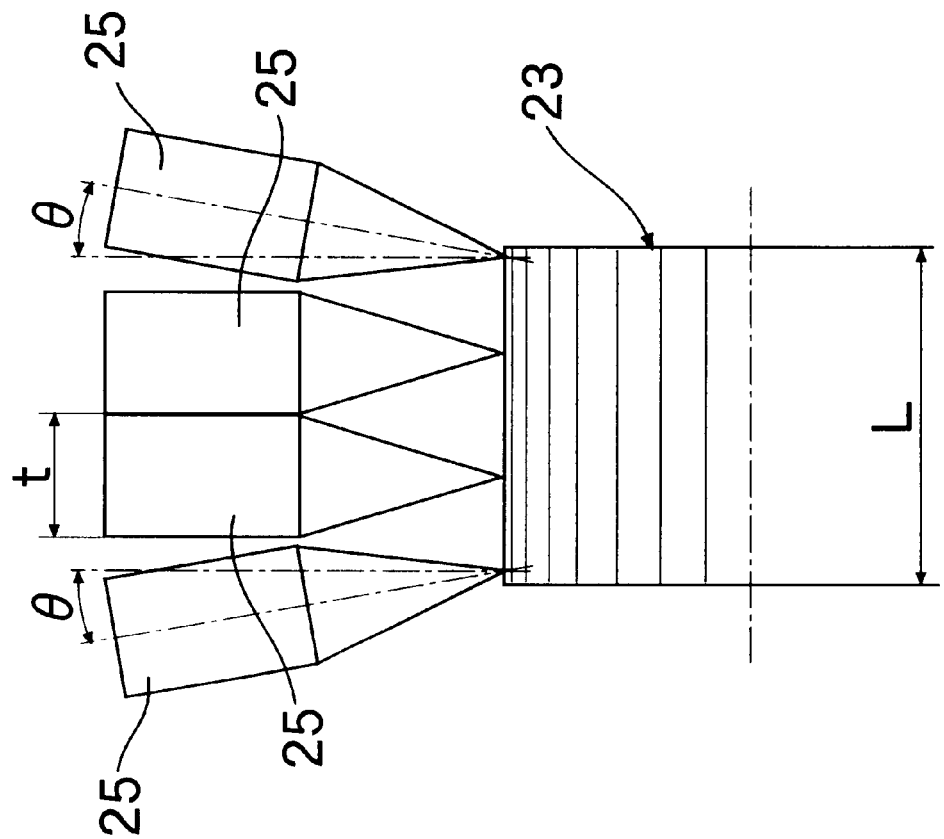

METAL SUPPORT FOR EXHAUST GAS PURIFYING CATALYST

BACKGROUND OF THE INVENTION

1. Field of the Invention

The present invention relates to a metal support for exhaust gas purifying catalyst, which is configured such that a honeycomb structure is mounted in a cylindrical casing.

2. Description of the Related Art

In related art honeycomb structures of a type in which a metal flat sheet and a metal corrugated sheet overlapped thereon are spirally wound, the metal flat sheet is joined to the metal corrugated sheet using a binder composed of a Ni-based brazing filler metal. Also a method of joining a metal flat sheet to a metal corrugated sheet using a stopper in place of the binder is described in Japanese Patent Application Laid-open No. 5-228376, and a method of joining the end portion of a metal flat sheet to the end portion of a metal corrugated sheet by welding is described in Japanese Patent Publication No. 4-35271.

Incidentally, the joining of a metal flat sheet to a metal corrugated sheet using a binder is allowed to ensure a sufficient joining area, which is effective to increase a mechanical strength; however, it has the following problem: namely, if a metal support composed of a cylindrical casing containing a honeycomb structure in which a metal flat sheet is joined to a metal corrugated sheet using the binder is repeatedly heated and cooled in a real service environment, then there may occur breakage of the metal flat sheet and the metal corrugated sheet and/or peeling of the joining portion, finally leading to looseness of the honeycomb structure from the cylindrical casing.

A honeycomb structure in which a metal flat sheet is joined to a metal corrugated sheet using the stopper described in Japanese Patent Application Laid-open No. 5-228376, mentioned above, exhibits a good durability against repeated heating and cooling; however, it has a problem in terms of durability against vibration because the metal flat sheet is not joined to the metal corrugated sheet, which tends to cause breakage of the metal flat sheet and the metal corrugated sheet. Even if the end portions of the metal flat sheet and the metal corrugated sheet are joined to the stopper by welding or the like in order to avoid the above problem, there occurs another problem in terms of the increased ventilation resistance due to the stopper.

A metal support composed of a cylindrical casing containing a honeycomb structure in which the end portion of a metal flat sheet is welded to the end portion of a metal corrugated sheet as described in Japanese Patent Publication No. 4-35271, mentioned above, is poor in durability against vibration because only the end portions of the metal flat sheet and the metal corrugated sheet are welded to each other, with a result that there may occur breakage of the metal flat sheet and the metal corrugated sheet and/or peeling of the joining portion, finally leading to falling of the honeycomb structure from the cylindrical casing.

To solve the above-described problems, there may be considered a honeycomb structure in which a metal flat sheet is welded to a metal corrugated sheet at a plurality of welding positions arranged on each of mutual contact portions of the metal flat sheet and the metal corrugated sheet.

SUMMARY OF THE INVENTION

In view of the foregoing, the present invention has been made, and an object of the present invention is to provide a honeycomb structure, which is capable of improving a durability against thermal stress of the honeycomb structure and a durability against mechanical vibration of the honeycomb structure by specifying welding positions at the time when a metal flat sheet is welded to a metal corrugated sheet.

To achieve the above object, according to a first aspect and feature of this invention, there is provided a metal support for exhaust gas purifying catalyst, which is configured such that a cylindrical honeycomb structure is formed by spirally winding a strip metal flat sheet and a strip metal corrugated sheet overlapped thereon while welding, for each turn, the metal flat sheet to the metal corrugated sheet at a plurality of welding positions axially arranged on each of mutual contact portions of the metal flat sheet and the metal corrugated sheet; and the honeycomb structure, on the surface of which exhaust gas purifying catalyst is supported, is mounted in a cylindrical casing, characterized in that the maximum value L1 of distances each between adjacent ones of the plurality of welding positions satisfies at least one of relationships given by $$L_1 \leq D/2 \text{ and } L_1 \leq L/2$$

where L is the axial length of the honeycomb structure and D is the diameter of the honeycomb structure.

With this configuration, it is possible to prevent occurrence of breakage of the metal flat sheet and the metal corrugated sheet and peeling of weld portions, and hence to improve a durability against thermal stress of the honeycomb structure and a durability against mechanical strength of the honeycomb structure.

According to a second aspect and feature of this invention, there is provided a metal support for exhaust gas purifying catalyst, which is configured such that a cylindrical honeycomb structure is formed by spirally winding a strip metal flat sheet and a strip metal corrugated sheet overlapped thereon while welding, for each turn, the metal flat sheet to the metal corrugated sheet at a plurality of welding positions axially arranged on each of mutual contact portions of the metal flat sheet and the metal corrugated sheet; and the honeycomb structure, on the surface of which exhaust gas purifying catalyst is supported, is mounted in a cylindrical casing, characterized in that the distance L2 between the outermost one of the plurality of the welding positions in the axial direction of the honeycomb structure and the outer end surface of the honeycomb structure satisfies at least one of relationships given by $$L_2 \leq D/20 \text{ and } L_2 \leq L/10$$

where L is the axial length of the honeycomb structure and D is the diameter of the honeycomb structure.

With this configuration, it is possible to prevent occurrence of breakage of the metal flat sheet and the metal corrugated sheet and peeling of weld portions, and hence to improve a durability against thermal stress of the honeycomb structure and a durability against mechanical strength of the honeycomb structure.

According to a third aspect and feature of this invention, there is provided a metal support for exhaust gas purifying catalyst, which is configured such that a cylindrical honeycomb structure is formed by spirally winding a strip metal flat sheet and a strip metal corrugated sheet overlapped thereon while laser welding using a laser beam, for each turn, the metal flat sheet to the metal corrugated sheet at a plurality of welding positions axially arranged on each of mutual contact portions of the metal flat sheet and the metal corrugated sheet; and the honeycomb structure, on the surface of which exhaust gas purifying catalyst is supported, is mounted in a cylindrical casing, characterized in that the laser welding, at the outermost one of the plurality of welding positions in the axial direction of the honeycomb structure, is performed by irradiating the outer end surfaces of the metal flat sheet and the metal corrugated sheet with the laser beam; and the laser welding, at each of the remaining positions, is performed by irradiating the circumferential surfaces of the metal flat sheet and the metal corrugated sheet with the laser beam.

With this configuration, it is possible to certainly weld the metal flat sheet to the metal corrugated sheet while avoiding burning-through of the outer end surfaces of the metal flat sheet and the metal corrugated sheet.

Hereinafter, a mode for carrying out the present invention will be described with reference to an embodiment shown in the accompanying drawings.

BRIEF DESCRIPTION OF THE DRAWINGS

FIGS. 1 to 9C show one embodiment of the present invention, wherein

FIG. 1 is a side view of an exhaust system of a motorcycle;

FIG. 2 is an enlarged sectional view taken on line 2—2 of FIG. 1;

FIG. 3 is an enlarged view seen in the direction shown by the arrow 3 of FIG. 2;

FIG. 4 is a sectional view taken on line 4—4 of FIG. 3;

FIG. 5 is a perspective view of a metal support for exhaust gas purifying catalyst, with parts partially cutaway;

FIGS. 7A and 7B are diagrams each showing a layout of a welding torch;

FIG. 8 is a diagram showing a relationship between the inclination angle of a welding torch and a laser irradiation area; and FIGS. 9A, 9B and 9C are diagrams each illustrating the arrangement of a welding torch upon welding of the outer end portion of a honeycomb structure.

DETAILED DESCRIPTION OF THE PREFERRED EMBODIMENTS

The embodiments for carrying out the present invention will now be described below with reference to the accompanying drawings.

Figure 1:
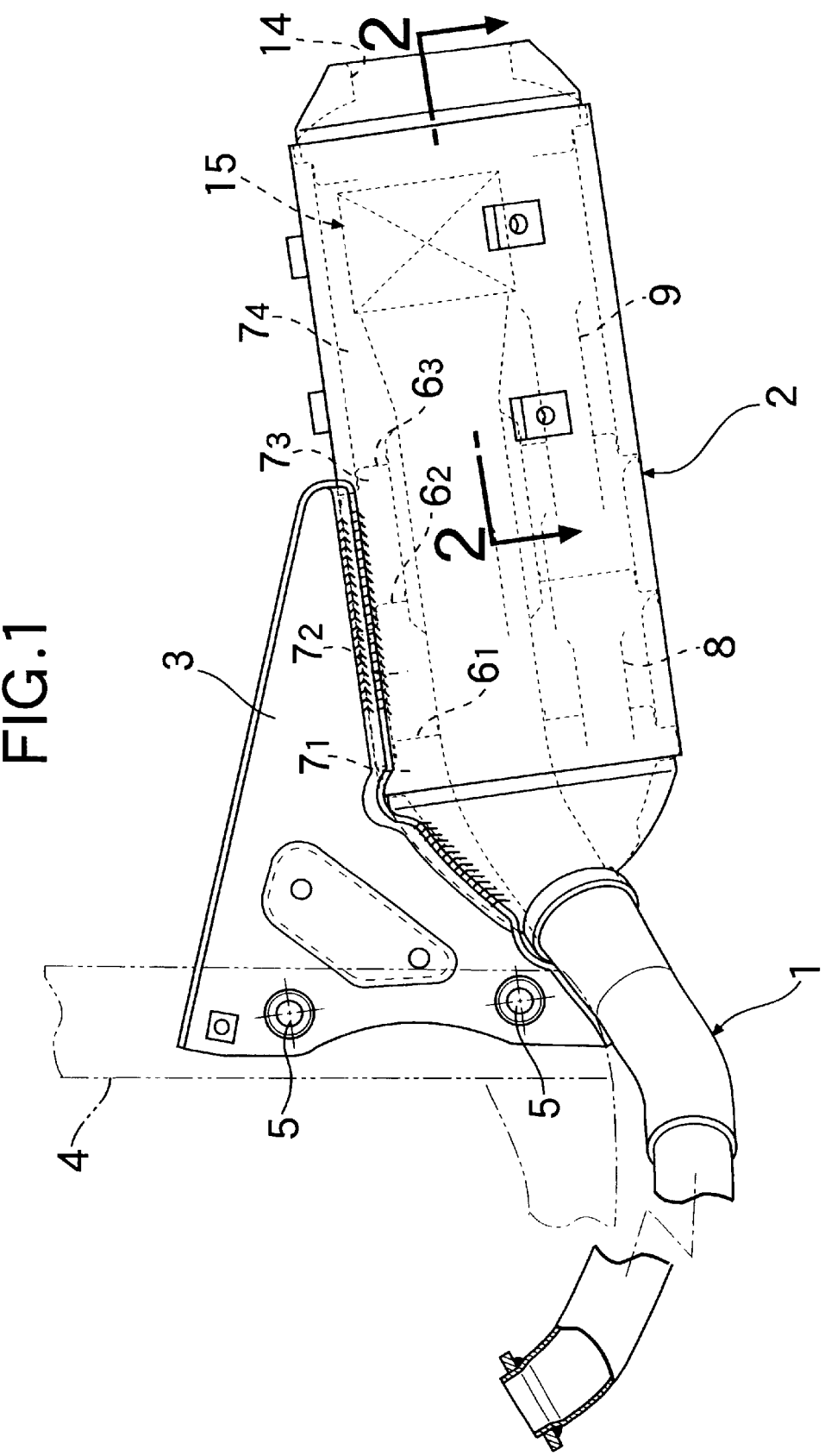
Figure 2:
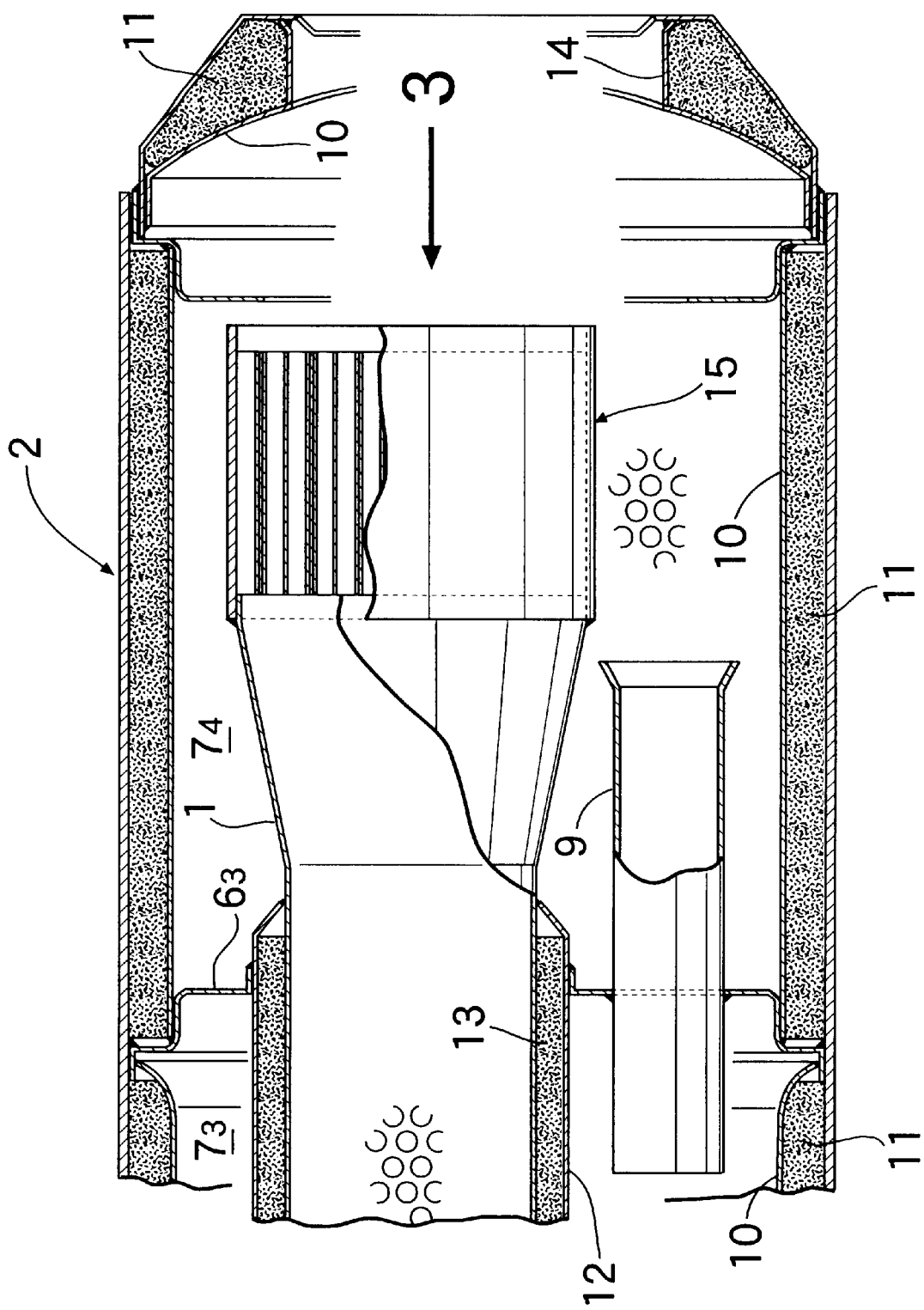

An exhaust system of a motorcycle, shown in FIGS. 1 and 2, includes an exhaust pipe 1 extending from an engine to the rear of a vehicular body, and a muffler 2 provided on the rear of the exhaust pipe 1. A mounting bracket 3 integrally welded on the muffler 2 is fixed on a body frame 4 with two bolts 5. The inside of the muffler 2 is partitioned into first to fourth expansion chambers $7_1$ to $7_4$ by means of three partition walls $6_1$, $6_2$ and $6_3$. The first expansion chamber $7_1$ is communicated to the second expansion chamber $7_2$ via a pipe 8 penetrating the partition wall $6_1$, and the third expansion chamber $7_3$ is communicated to the fourth expansion chamber $7_4$ via a pipe 9 penetrating the partition wall $6_3$.

The exhaust pipe 1 inserted in the muffler 2 is communicated to the first to fourth expansion chambers $7_1$ to $7_4$ via punching holes formed therein. On the inner peripheral surface of the muffler 2 is held a stainless steel wool 11 via a punching metal 10, and on the outer peripheral surface of the exhaust pipe 1 is held a stainless steel wool 13 via a punching metal 12.

A metal support 15 for exhaust gas purifying catalyst according to the present invention is mounted to the rear end of the exhaust pipe 1, the rear end of which is located in the fourth expansion chamber $7_4$ having at its rear end an exhaust hole 14.

Figure 3:
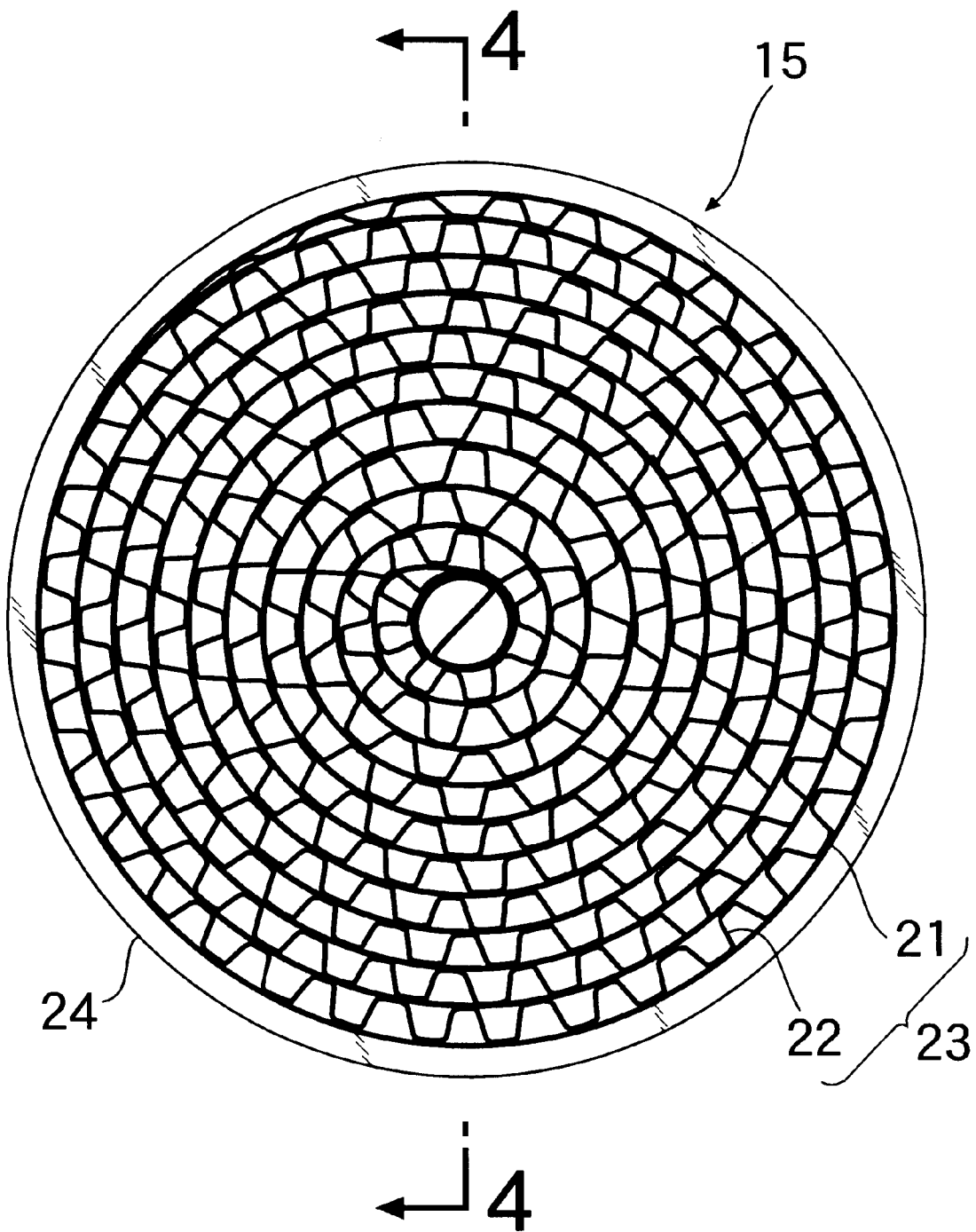
Figure 4:
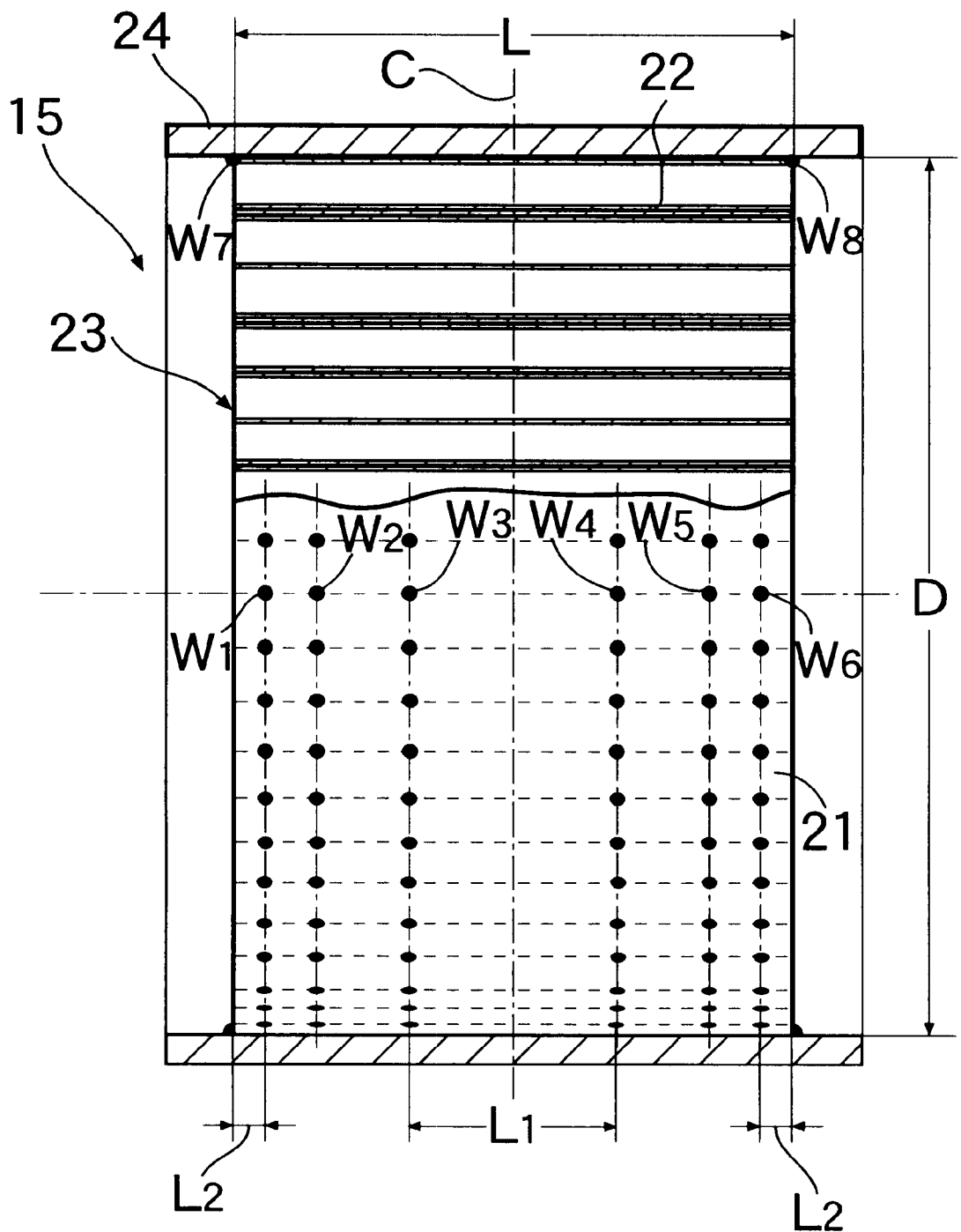
Figure 5:
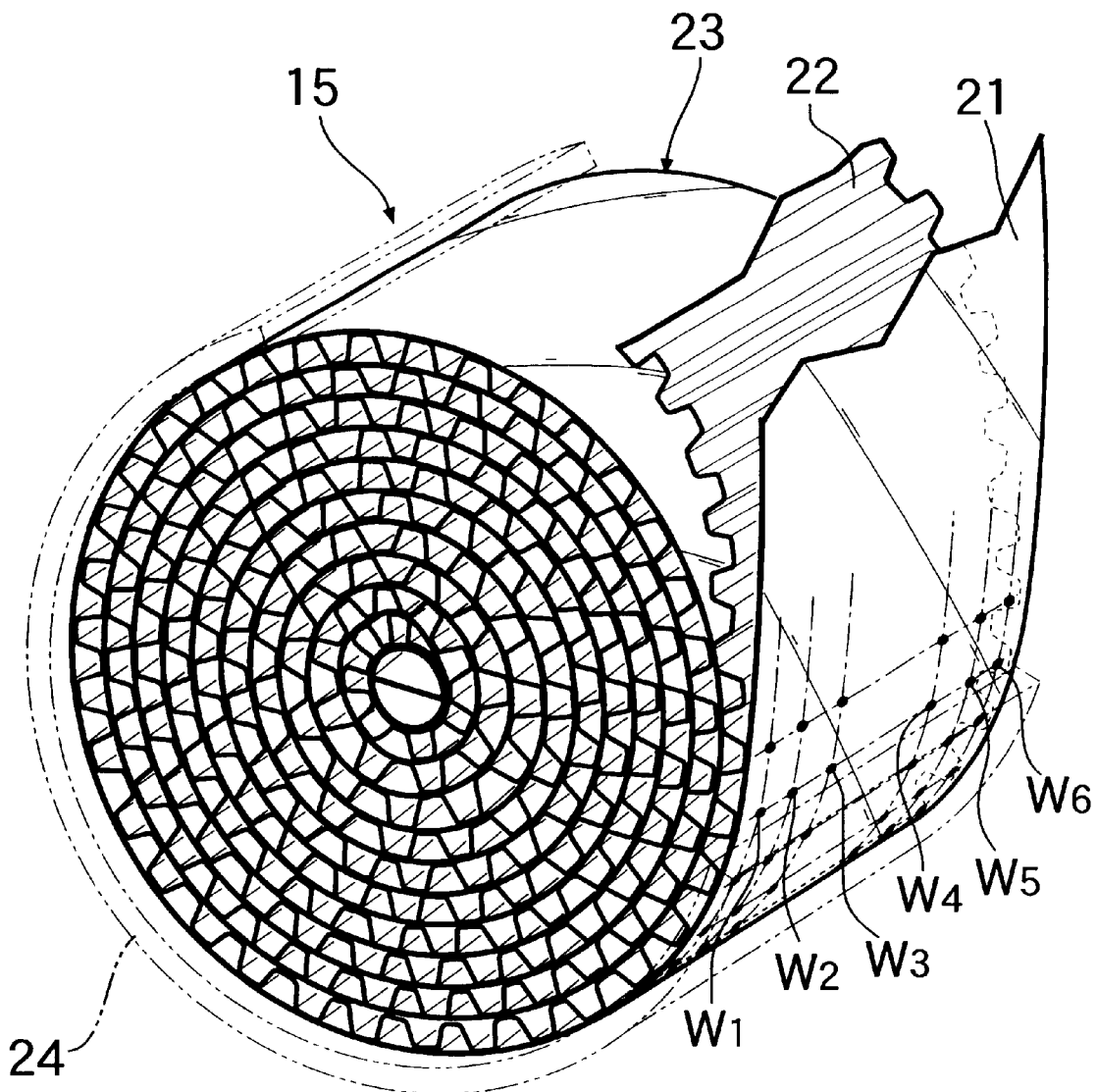

As is apparent from FIGS. 3 to 5, the metal support 15 for exhaust gas purifying catalyst includes a honeycomb structure 23 and a cylindrical casing 24 for containing the honeycomb structure 23. The honeycomb structure 23 is composed of a metal flat sheet 21 and a metal corrugated sheet 22 each of which is made from a ferrite-based heat-resisting stainless steel and has a thickness of about 50 µm. The cylindrical casing 24 is made from a ferrite-based heat-resisting stainless steel. The metal flat sheet 21 and the metal corrugated sheet 22 are each formed into a strip having the same width. In the metal corrugated sheet 22, crests and valleys extending in the direction perpendicular to the longitudinal direction of the metal corrugated sheet 22 are alternately arranged. When the metal flat sheet 21 and the metal corrugated sheet 22 overlapped thereon are doubly wound, the crests and the valleys of a wound metal corrugated sheet 22 are brought in contact with the upper and lower sides of the metal flat sheet 21 adjacent thereto. Thus, the metal flat sheet 21 is joined to the metal corrugated sheet 22 by spirally winding the metal flat sheet 21 and the metal corrugated sheet 22 overlapped thereon while spot-welding using a laser beam, for each turn, the metal flat sheet 21 to the metal corrugated sheet 22 at six pieces of welding positions $W_1$ to $W_6$ arranged on each of mutual contact portions.

The honeycomb structure 23 having the above configuration is formed into a cylindrical shape having the axial length L and the diameter D. In a state in which the honeycomb structure 23 is inserted in the inner peripheral surface of the cylindrical casing 24, the peripheral edges of both the outer end surfaces of the honeycomb structure 23 are joined to the peripheral edges of both the inner end surfaces of the cylindrical casing 24 at welding positions $W_7$ and $W_8$ by continuous pulse welding using a laser beam.

As is apparent from FIG. 4, the six welding positions $W_1$ to $W_6$ are arranged symmetrically with respect to the center line C of the honeycomb structure 23 in the axial direction. Specifically, three pieces of the welding positions $W_1$ to $W_3$ are arranged on one side of the center line C and three pieces of the welding positions $W_4$ to $W_6$ are arranged on the other side of the center line C. Of the distances each between the adjacent ones of the welding positions $W_1$ to $W_6$, the distance between the welding positions $W_3$ and $W_4$ is set at the maximum value which is designated by symbol L1 in FIG. 4. Also the distance between the outermost welding position $W_1$ ($W_6$) which is furthest from the center C and the outer end surface of the honeycomb structure 23 is designated by symbol L2 in FIG. 4.

TABLE 1

|  | Spec. A | Spec. B | Spec. C | Spec. D |
| --- | --- | --- | --- | --- |
| D(D/2) | 60(30) | 60(30) | 51(25.5) | 60(30) |
| L(L/2) | 30(15) | 40(20) | 75(37.5) | 40(20) |
| $L_1$ | 24 | 24 | 59 | overall surfaces of contact portions: brazed |
| $L_2$ | 1 | 3 | 3 |  |

Table 1 shows data of four kinds of metal supports for exhaust gas purifying catalyst, which are indicated by Specifications (Specs.) A to D. In each of Specs. A to C, the metal flat sheet 21 is spot-welded to the metal corrugated sheet 22 at six pieces of the welding positions $W_1$ to $W_6$ arranged on each of the mutual contact portions; and in Spec. D, the metal flat sheet 21 is brazed to the metal corrugated sheet 22 at overall surfaces of the contact portions. Specs. A and B are based on the present invention, and Specs. C and D are out of the present invention. To be more specific, Specs. A and B each satisfy one relationship ($L_1 \leq D/2$) in the first requirement ($L_1 \leq D/2$ or $L_1 \leq L/2$), and satisfy both the relationships in the second requirement ($L_2 \leq D/20$ or $L_2 \leq L/10$).

Figure 6A:
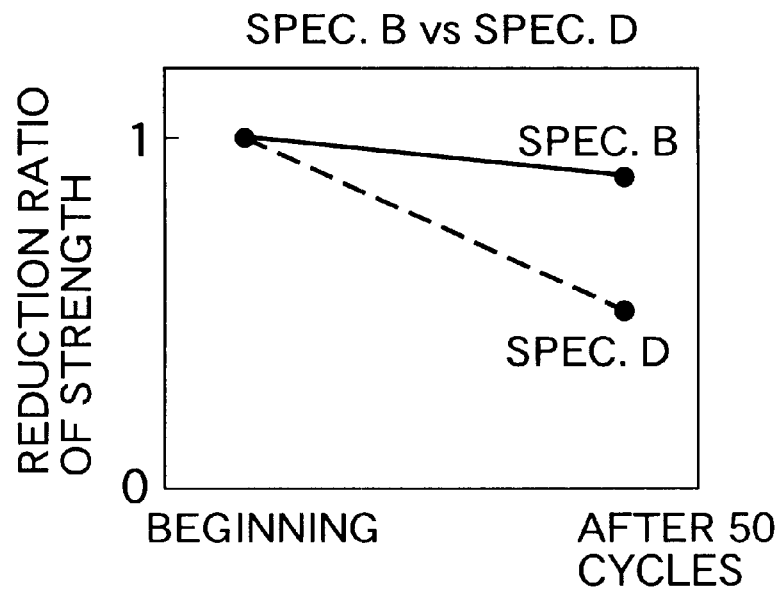
FIGS. 6A and 6B are graphs each showing a reduction ratio of the strength of a metal support after the metal support is subjected to repeated heat cycles.

Metal supports prepared under Specs. B and D identical to each other in axial length L and diameter D of the honeycomb structure 23 were subjected to a repeated heat cycle test. In this test, a heat cycle in which the metal support is heated from an ordinary temperature to 1000° C. and cooled from 1000° C. to the ordinary temperature is repeated 50 cycles. As a result, for the metal support prepared under Spec. D in which the metal flat sheet 21 was brazed to the metal corrugated sheet 22 at overall surfaces of the contact portions, there occurred breakage of the metal flat sheet 21 and metal corrugated sheet 22 and peeling of the joining portions. On the contrary, for the metal support prepared under Spec. B according to the present invention, there occurred no breakage and peeling. Also, as shown in FIG. 6A, for the metal support prepared under Spec. B, the strength against a load acting to push out the honeycomb structure 23 from the cylindrical housing 24 was little reduced; while for the metal support prepared under Spec. D, the strength was significantly reduced.

Metal supports prepared under Specs. B and D were also subjected to the above repeated heat cycle test (50 cycles). Spec. C, which is out of the present invention, does not satisfy both relationships in the first requirement ($L_1 \leq D/2$ or $L_1 \leq L/2$), and satisfies only one relationship ($L_2 \leq L/10$) in the second requirement ($L_2 \leq D/20$ or $L_2 \leq L/10$).

Figure 6B:
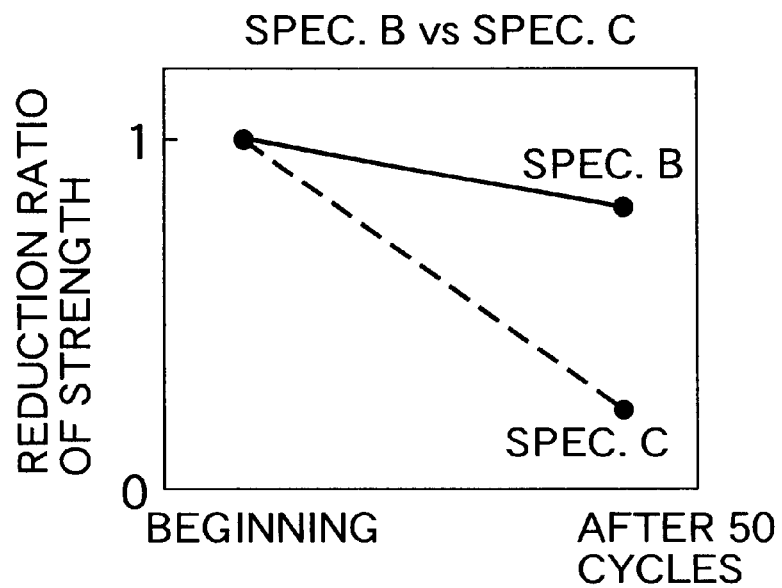

As a result, for the metal support prepared under Spec. C, there occurred no breakage of the metal flat sheet 21 and the metal corrugated sheet 22 and no peeling of the joining portions; however, as shown in FIG. 6B, there was significantly reduced the strength against a load acting to push out the honeycomb structure 23 from the cylindrical housing 24. Of course, for the metal support prepared under Spec. B, there occurred no breakage of the metal flat sheet 21 and the metal corrugated sheet 22 and no peeling of the joining portions, and also there was only slightly reduced the strength against a load acting to push out the honeycomb structure 23 from the cylindrical housing 24.

It is considered that the differences in thermal fatigue among the above metal supports may occur in the following reason.

Oxidation of each of the metal flat sheet 21 and the metal corrugated sheet 22 due to repeated heat cycle produces creep elongation which in turn causes the honeycomb structure 23 to be thermally expanded about 3% in the axial direction. Accordingly, if a distance between the adjacent ones of the welding positions is increased, the load applied to the welding positions $W_1$ to $W_6$ is correspondingly increased, with a result that the weld portions may be broken, to thereby reduce the strength of the honeycomb structure 23.

TABLE 2

| Specification | Result of Durability Test |
|---|---|
| A (inventive example) | no peeling of joining portions and no breakage of sheets |
| B (inventive example) | Same as above |
| C | peeling of joining portions near outer peripheral portion during durability test, and falling of honeycomb structure due to breakage of sheets |

Each of the metal supports prepared under Specs. A to C was mounted on a real motorcycle and was subjected to a durability test under a real service condition. The results are shown in Table 2.

For the metal support prepared under Spec. C out of the present invention, the outer peripheral portiosn and its neighborhood of the honeycomb structure 23 were broken, to cause the falling of the honeycomb structure 23 from the cylindrical casing 24. On the contrary, for each of the metal supports prepared in Specs. A and B according to the present invention, there occurred no breakage of the metal flat sheet 21 and the metal corrugated sheet 22 and no peeling of the joining portions, and also there occurred no falling of the honeycomb structure 23 from the cylindrical casing 24.

In addition, for each of the metal supports prepared under Specs. A to C, since the metal flat sheet 21 was welded to the metal corrugated sheet 22 at six pieces of the welding positions $W_1$ to $W_6$ on each of the contact portions, there is no problem associated with a durability against mechanical vibration. Further, each of the metal supports prepared under Specs. A and B does not satisfy one relationship ($L_1 \leq L/2$) in the first requirement ($L_1 \leq D/2$ or $L_1 \leq L/2$); however, since the allowable range of $L_1$ can be specified by any one of the axial length L and the diameter D which are typical dimensions of the honeycomb structure 23, the desired effect can be obtained insofar as the honeycomb structure 23 satisfies at least one of the relationships given by $L_1 \leq D/2$ and $L_1 \leq L/2$.

In the case of spot-welding, as in the above honeycomb structure 23, the metal flat sheet 21 to the metal corrugated sheet 22 at a plurality of the welding positions $W_1$ to $W_6$ axially arranged on each of the mutual contact portions of the metal flat sheet 21 and the metal corrugated sheet 22, it takes a lot of time to spot-welding, using a single welding torch, the metal flat sheet 21 to the metal corrugated sheet 22 at the plurality of welding positions $W_1$ to $W_6$ in sequence by moving the single welding torch in the axial direction. This gives rise to a problem in degrading the productivity. To solve such a problem, it may be considered to arrange a plurality of welding torches of the same number as that of the welding positions and to simultaneously spot-welding the metal flat sheet 21 to the metal corrugated sheet 22 at the plurality of the welding positions. In this case, however, as shown in FIG. 7A, in the case where four pieces of welding torches 25 each having a diameter t are arranged in parallel to each other, if $3t > L$ (L: axial length of the honeycomb structure 23), the welding torches 25 arranged at both the ends are out of the honeycomb structure 23 and thereby they are sometimes not allowed to conduct spot-welding. In such a case, as shown in FIG. 7B, the welding torches 25 arranged at both the ends may be each inclined inward an angle θ with respect to the normal line of the honeycomb structure 23. This allows spot-welding by the welding torches 25 arranged at both the ends.

Figure 8:
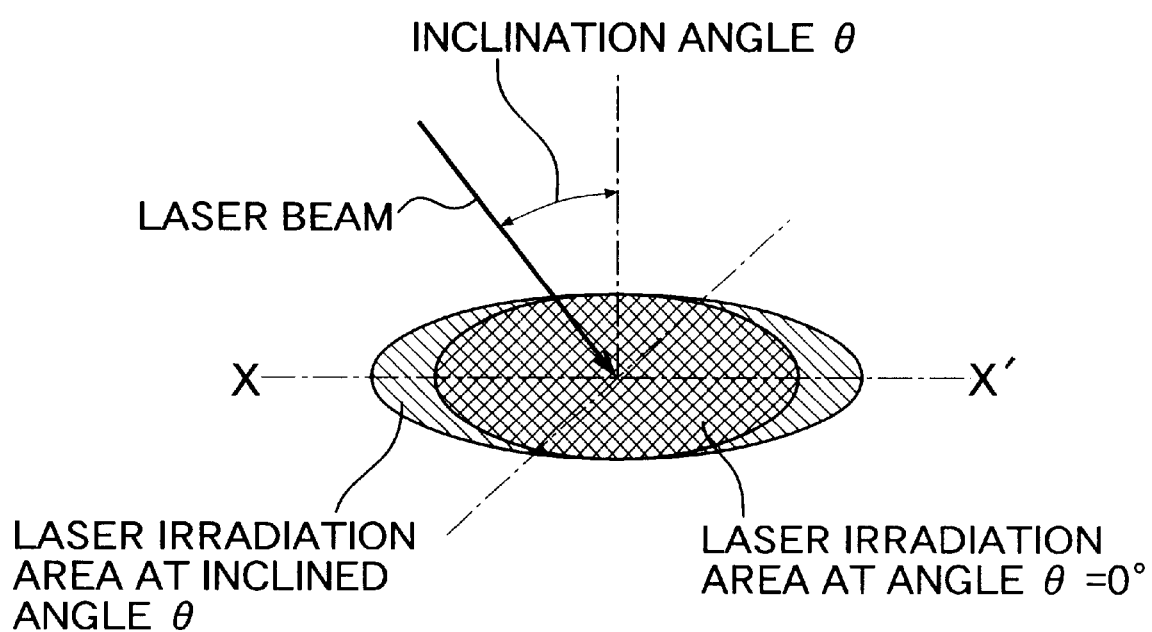

As results of welding tests, it was confirmed that the inclination angle θ of the welding torch 25 is desirably in a range of $0 \leq \theta \leq 45°$ from the balance between the welding strength (welding penetration amount) and the irradiation energy of a laser beam. For example, when the angle θ is gradually increased with the irradiation energy of one shot set at 3.5 J in laser welding using a YAG laser beam spot-welding machine of a grade of 100 W, as shown in FIG. 8, the irradiation area of the laser beam is gradually increased and correspondingly the energy density of the irradiation plane is reduced, so that the welding penetration amount is reduced. That is to say, the welding strength is affected by the welding penetration amount and the irradiation area of the laser beam which are changed depending on the angle θ. As a result, it is possible to enhance the welding strength by suitably selecting the angle θ.

Figure 9A:
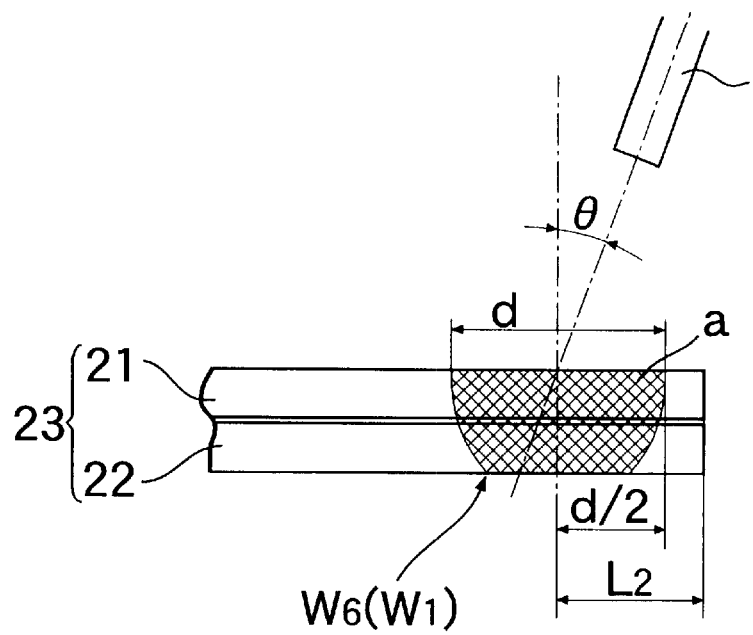
Figure 9B:
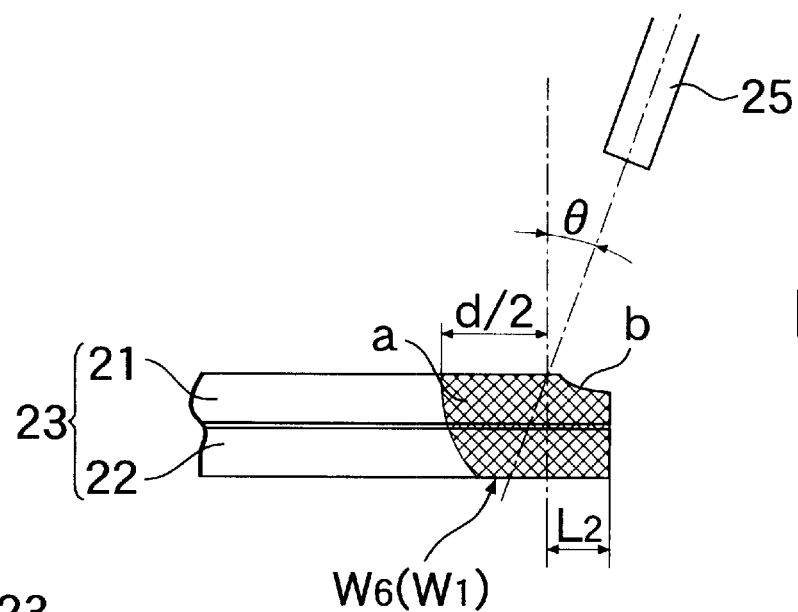

Letting d be the diameter of the laser beam emitted from the welding torch 25, as shown in FIG. 9A, if the distance $L_2$ between the outermost welding position $W_6$ ($W_1$) and the outer end surface of the honeycomb structure 23 satisfies a relationship of $d/2<L_2$, a weld nugget a never reach the outer end surface of the honeycomb structure 23; however, as shown in FIG. 9B, if $L_2$ falls into a relationship of $d/2 \leq L_2$, the weld nugget a reaches the outer end surface of the honeycomb structure 23, tending to cause a burning-through portion b thereat. Accordingly, the minimum value of the distance $L_2$ between the outermost welding position $W_1$ or $W_6$ and the outer end surface of the honeycomb structure 23 is preferably set to satisfy the relationship of $d/2<L_2$.

Figure 9C:
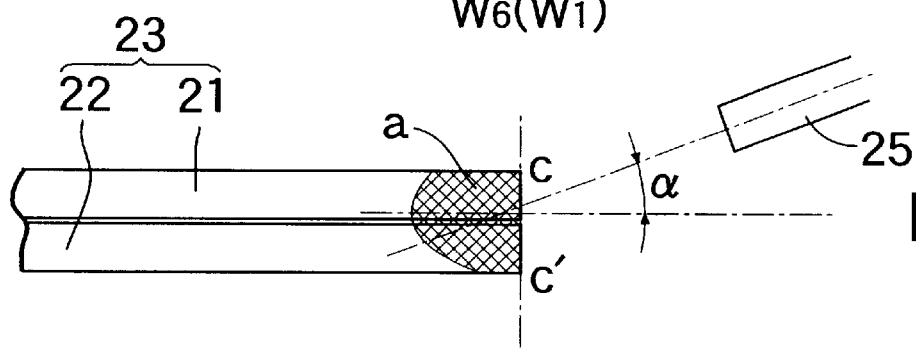

However, the use of the following procedure makes it possible to sufficiently strongly spot-weld the metal flat sheet 21 to the metal corrugated sheet 22 at the outermost welding position $W_1$ or $W_6$ while avoiding burning-through of the outer end surface of the honeycomb structure 23. To be more specific, as shown in FIG. 9C, the target position for the welding position $W_6$ ($W_1$) is set at the outer end surfaces (in the range of c—c in FIG. 9C) of the metal flat sheet 21 and the metal corrugated sheet 22 and the angle $\alpha(\alpha=90°-\theta)$ of the welding torch 25 is set at a value in a range of $0° \leq \alpha \leq 60°$.

TABLE 3

| target position result of welding | $L_2 = 0.5$ burning-through of sheets | $L_2 = 0.2$ burning-through of sheets | $L_2 = 0$ good |
|---|---|---|---|

Table 3 shows the result of comparison between spot-welding of the circumferential surfaces of the metal flat sheet 21 and the metal corrugated sheet 22 to each other with spot-welding of the outer end surfaces of the metal flat sheet 21 and the metal corrugated sheet 22 to each other. In this test, spot-welding was performed using the YAG laser beam spot-welding machine of a grade of 100 W, wherein the diameter d of the laser beam was set at 1 mm (upon just focus) and the angle α of the welding torch 25 was set at 45°. In the case of spot-welding of the circumferential surfaces of the metal flat sheet 21 and the metal corrugated sheet 22 to each other ($L_2=0.5$ mm or 0.2 mm), there occurred the burning-through b as shown in FIG. 9B. Meanwhile, in the case of spot-welding of the outer end surfaces of the metal flat sheet 21 and the metal corrugated sheet 22 to each other ($L_2=0$), good welding result was obtained as shown in FIG. 9C.

In the case of welding the outer end surfaces of the metal flat sheet 21 and the metal corrugated sheet 22 to each other, the irradiation energy for one shot is as sufficiently small as 1.5 J which is a half or less the irradiation energy (3.5 J) for one shot in the case of welding the circumferential surfaces thereof to each other, and also continuous pulse welding can be used in place of single spot-welding.

While the embodiment of the present invention has been described in detail, such description is for illustrative purposes only, and it is to be understood that various changes in design may be made without departing from the scope of the present invention.

For example, in the embodiment, the metal flat sheet 21 is welded to the metal corrugated sheet 22 at six pieces of the welding positions $W_1$ to $W_6$ arranged on each of the contact portions; however, the number of the welding positions does not limited to six pieces but may be plural pieces.

What is claimed is:

1. A metal support for an exhaust gas purifying catalyst, said metal support comprising a cylindrical honeycomb structure including a spirally wound strip metal flat sheet and a spirally wound strip metal corrugated sheet overlapped on said strip metal flat sheet, wherein, for each turn, a first circumferential surface of said metal flat sheet contacts and is welded, using a laser beam, to said metal corrugated sheet at a plurality of axially arranged welding positions corresponding to mutual contact portions where said first circumferential surface said metal flat sheet contacts said metal corrugated sheet; and said metal support further comprising cylindrical casing within which said honeycomb structure is mounted, wherein said plurality of welding positions are arranged to satisfy the following condition:

a first condition wherein a maximum value $L_1$ of distances each between adjacent ones of said plurality of welding positions satisfies at least one of relationships given by $L_1 \leq D/2$ and $L_1 \leq L/2$ where L is the axial length of said honeycomb structure and D is the diameter of said honeycomb structure, a second condition wherein a distance $L_2$ between an outermost one of said plurality of said welding positions in the axial direction of said honeycomb structure and an outer end surface of said honeycomb structure satisfies at least one of relationships given by $L_2 \leq D/20$ and $L_2 \leq L/10$, and a third condition of $L_2>d/2$, wherein d is the diameter of the laser beam used to perform the welding operation.

* * * * *